US 9,625,953 B2

(12) United States Patent
Bitz et al.

(10) Patent No.: US 9,625,953 B2
(45) Date of Patent: Apr. 18, 2017

(54) COVERED MULTI-PIVOT HINGE

(71) Applicant: Microsoft Technology Licensing, LLC, Redmond, WA (US)

(72) Inventors: Brian Bitz, Sherwood, OR (US); John Campbell, Puyallup, WA (US); Errol Mark Tazbaz, Bellevue, WA (US); Joe Gault, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/538,786

(22) Filed: Nov. 11, 2014

(65) Prior Publication Data
US 2016/0132076 A1    May 12, 2016

(51) Int. Cl.
*H05K 5/00* (2006.01)
*G06F 1/16* (2006.01)
*H04M 1/02* (2006.01)

(52) U.S. Cl.
CPC .......... *G06F 1/1681* (2013.01); *G06F 1/1616* (2013.01); *H04M 1/022* (2013.01); *H04M 1/0216* (2013.01)

(58) Field of Classification Search
CPC .... G06F 1/1681; G06F 1/1616; H04M 1/022; Y10T 16/53864; Y10T 16/547; Y10T 16/5475; Y10T 16/52; H05K 5/0226
See application file for complete search history.

(56) References Cited

U.S. PATENT DOCUMENTS

| 4,611,710 | A | 9/1986 | Mitsufuji |
| 4,711,046 | A | 12/1987 | Herrgord |
| 5,056,192 | A | 10/1991 | Grass |
| 5,229,921 | A | 7/1993 | Bohmer |
| 5,509,590 | A | 4/1996 | Medeiros, Jr. et al. |
| 5,796,575 | A | 8/1998 | Podwalny et al. |
| 5,845,366 | A | 12/1998 | Kuroda |
| 5,987,704 | A | 11/1999 | Tang |
| 6,223,393 | B1 | 5/2001 | Knopf |
| 6,470,532 | B2 | 10/2002 | Rude |

(Continued)

FOREIGN PATENT DOCUMENTS

| CN | 204553530 U | 8/2015 |
| EP | 0844357 A1 | 5/1998 |

(Continued)

OTHER PUBLICATIONS

Response filed Jun. 29, 2016 to the Non-Final Office Action mailed Feb. 22, 2016 from U.S. Appl. No. 14/538,775, 12 pages.

(Continued)

*Primary Examiner* — Robert J Hoffberg
*Assistant Examiner* — Hung Dang
(74) *Attorney, Agent, or Firm* — Rainier Patents, P.S.

(57) ABSTRACT

The description relates to devices, such as computing devices that have hinged portions. One example can include a first portion and a second portion. This example can also include a multi-pivot hinge unit rotatably securing the first and second portions. This example can further include a covered sequentially rotating multi-pivot hinge assembly rotatably securing the first portion and the second portion in a manner that extends a footprint of the computing device as the first portion is rotated away from the second portion.

19 Claims, 10 Drawing Sheets

(56) References Cited

U.S. PATENT DOCUMENTS

| | | |
|---|---|---|
| 6,505,382 B1 | 1/2003 | Lam et al. |
| 6,527,036 B1 | 3/2003 | Welsh |
| 6,754,081 B2 | 6/2004 | Rude et al. |
| 6,757,160 B2 | 6/2004 | Moore et al. |
| 6,831,229 B1 | 12/2004 | Maatta et al. |
| 6,966,435 B2 | 11/2005 | Weiser et al. |
| 7,227,741 B2 | 6/2007 | Garel et al. |
| 7,251,129 B2 | 7/2007 | Lee et al. |
| 7,293,380 B2 | 11/2007 | Repecki |
| 7,418,766 B2 | 9/2008 | Nelson et al. |
| 7,520,025 B2 | 4/2009 | Hung |
| 7,584,524 B2 | 9/2009 | Hung |
| 7,636,985 B2 | 12/2009 | Greenbank |
| 8,024,843 B2 | 9/2011 | Endo et al. |
| 8,122,970 B2 | 2/2012 | Palen |
| 8,441,791 B2 | 5/2013 | Bohn et al. |
| 8,467,838 B2 | 6/2013 | Griffin et al. |
| 8,624,844 B2 | 1/2014 | Behar et al. |
| 8,649,166 B2 | 2/2014 | Wu et al. |
| 8,687,359 B2 | 4/2014 | Theobald et al. |
| 8,713,759 B2 | 5/2014 | Cai |
| 8,743,538 B2 | 6/2014 | Ashcraft et al. |
| 8,797,727 B2 | 8/2014 | Ashcraft et al. |
| 8,804,324 B2 | 8/2014 | Bohn et al. |
| 8,843,183 B2 | 9/2014 | Griffin et al. |
| 8,854,834 B2 | 10/2014 | O'Connor et al. |
| 9,243,432 B2 | 1/2016 | Lee |
| 2005/0122671 A1 | 6/2005 | Homer |
| 2006/0079277 A1 | 4/2006 | Ditzik |
| 2007/0039132 A1 | 2/2007 | Jung et al. |
| 2007/0049376 A1 | 3/2007 | Cho et al. |
| 2007/0117600 A1 | 5/2007 | Robertson et al. |
| 2008/0174089 A1 | 7/2008 | Ekberg |
| 2010/0154171 A1 | 6/2010 | Lombardi et al. |
| 2010/0232100 A1 | 9/2010 | Fukuma et al. |
| 2011/0000136 A1 | 1/2011 | Brun |
| 2011/0177850 A1 | 7/2011 | Griffin et al. |
| 2011/0292605 A1 | 12/2011 | Chen et al. |
| 2012/0147542 A1 | 6/2012 | Kim |
| 2012/0279014 A1 | 11/2012 | Carlsson et al. |
| 2013/0014346 A1 | 1/2013 | Ahn et al. |
| 2013/0081229 A1 | 4/2013 | Hirano |
| 2013/0135809 A1 | 5/2013 | Uchiyama et al. |
| 2013/0139355 A1 | 6/2013 | Lee et al. |
| 2013/0152342 A1 | 6/2013 | Ahn et al. |
| 2013/0216740 A1 | 8/2013 | Russell-Clarke et al. |
| 2013/0219663 A1 | 8/2013 | Cai |
| 2014/0084772 A1 | 3/2014 | Zhang et al. |
| 2014/0111954 A1 | 4/2014 | Lee et al. |
| 2014/0160055 A1 | 6/2014 | Margolis et al. |
| 2014/0174227 A1 | 6/2014 | Hsu et al. |
| 2014/0196253 A1 | 7/2014 | Song et al. |
| 2014/0196254 A1* | 7/2014 | Song ..................... E05D 3/14 16/302 |
| 2014/0217875 A1 | 8/2014 | Park et al. |
| 2014/0239065 A1 | 8/2014 | Zhou et al. |
| 2014/0245569 A1 | 9/2014 | Cho et al. |
| 2015/0092331 A1 | 4/2015 | Kinoshita et al. |
| 2015/0176317 A1 | 6/2015 | Lee |
| 2015/0277506 A1 | 10/2015 | Cheah et al. |
| 2015/0361696 A1 | 12/2015 | Tazbaz |
| 2015/0362956 A1 | 12/2015 | Tazbaz |
| 2016/0132075 A1 | 5/2016 | Tazbaz |
| 2016/0147267 A1 | 5/2016 | Campbell et al. |
| 2016/0187935 A1 | 6/2016 | Tazbaz et al. |
| 2016/0215541 A1 | 7/2016 | Tazbaz et al. |
| 2016/0357226 A1 | 12/2016 | Campbell et al. |

FOREIGN PATENT DOCUMENTS

| | | |
|---|---|---|
| EP | 1340879 A2 | 9/2003 |
| EP | 1464784 A1 | 10/2004 |
| EP | 2765478 A2 | 8/2014 |
| EP | 2765479 | 8/2014 |
| KR | 20140049911 A | 4/2014 |
| WO | 2016/077254 A1 | 5/2016 |

OTHER PUBLICATIONS

Response filed Jun. 29, 2016 to the Non-Final Office Action mailed Mar. 29, 2016 from U.S. Appl. No. 14/588,138, 10 pages.

Response and Demand filed Jun. 15, 2016 from from PCT Patent Application No. PCT/US2015/064173, 13 pages.

Response filed Jun. 29, 2016 to the Non-Final Office Action mailed Apr. 12, 2016 from U.S. Appl. No. 14/555,184, 10 pages.

Notice of Allowance mailed Jul. 14, 2016 from U.S. Appl. No. 14/555,184, 15 pages.

Final Office Action mailed Jul. 29, 2016 from U.S. Appl. No. 14/588,138, 31 pages.

Corrected Notice of Allowability mailed Aug. 4, 2016 from U.S. Appl. No. 14/555,184, 16 pages.

Article 34 Demand mailed May 4, 2016 from PCT Patent Application No. PCT/US2015/059798, 17 pages.

Final Office Action mailed Jun. 1, 2016 from U.S. Appl. No. 14/606,979, 48 pages.

Article 34 Demand mailed Jun. 8, 2016 from PCT Patent Application No. PCT/US2015/060959, 14 pages.

"Bi-Fold Hinges", published on May 9, 2012, retrieved from <<http://catalog.monroehinge.com/category/bi-fold-hinges, 1 page.

"Finger Protecta", Jul. 3, 2011, retrieved from <<http://shop.stormflame.com/finger-protecta-142-p.asp>> on Sep. 9, 2014, 2 pages.

"Fingersafe", May 26, 2013, retrieved from <<http://fingersafe.com/>>on Sep. 9, 2014, 2 pages.

"Laptop back covers shell for Dell 15R 5520 7520 M521R 5525 PN T87MC laptop hinge cover", retrieved from <<http://www.alibaba.com/product-detail/Laptop-back-covers-shell-For-Dell_1628979107.html>>on Sep. 8, 2014, 3 pages.

"Moving Point Hinge-Multipivot Hinge", retrieved on Oct. 9, 2014, at <<http://websystem.gismo.se/Gismo/files/1029/2.mph%2001%20introduktion.pdf>>, 6 pages.

"Multi-function stainless steel hydraulic shower door pivot hinge", retrieved on Sep. 10, 2015, at <<http://www.alibaba.com/product-detail/Multi-function-stainless-steel-hydraulic-shower_60153561047.html>>10 pages.

"Plastic Slatband Chains", retrieved on Sep. 10, 2015, at <<http://www.irp.co.za/wp-content/assets/LFC002-7.5-Straight-Running-Double-Hinge-Chain.pdf>>, 1 page.

"Polyprop Boxes Accessories", Jun. 28, 2013 retrieved from <<http://www.presentingbinders.co.uk/Polyprop_Boxes_Accessories.html>>on Sep. 10, 2014, 6 pages.

"Samet SoftCover hinge wins the Innovation Award 2013", Feb. 8, 2013, retrieved from <<http://www.kozsusanidesign.com/samet-softcover-hinge-wins-the-innovation-award-2013/>>on Sep. 9, 2014, 2 pages.

"Single and double hinge type LBP (820 & 821 LBP)" retrieved on Sep. 10, 2015, at <<http://www.papadopoulos-bros.gr/en/proionta/erpystries-metaforikes-tainies/erpystries/plastikes/eutheias/monou-kai-diplou-mentese-typou-lbp-820-821-lbp/>>, 1 page.

"Straight Running Chains", published Jul. 15, 2013, retrieved at <<http://www.ultraplastindia.com/stainless-steel-slat-chains.html>>, 2 pages.

"System Plast LF 820 K400 Acetal Straight Running Chain, 4 Width, 120" Length, Single Hinge", retrieved on Sep. 10, 2015, at <<http://www.amazon.com/System-Plast-Acetal-Straight-Running/dp/B00MJXUDIA>>, 3 pages.

Elliott, Amy-Mae, "9 Nifty Laptop Feet to Keep Your PC Running Cool", published on Jul. 30, 2012, retrieved at <<http://mashable.com/2012/07/30/laptop-feet/>>, 26 pages.

Non-Final Office Action mailed Feb. 22, 2016 from U.S. Appl. No. 14/538,775, 23 pages.

International Search Report mailed Jan. 4, 2016 from PCT Patent Application No. PCT/US2015/059798, 13 pages.

Non-Final Office Action mailed Dec. 10, 2015 from U.S. Appl. No. 14/606,979, 20 pages.

(56) References Cited

OTHER PUBLICATIONS

International Search Report mailed Jan. 25, 2016 from PCT Patent Application No. PCT/US2015/060959, 11 pages.
International Search Report mailed Jan. 4, 2016 from PCT Patent Application No. PCT/US2015/059799, 13 pages.
Non-Final Office Action mailed Mar. 29, 2016 from U.S. Appl. No. 14/588,138, 34 pages.
International Search Report and Written Opinion mailed Feb. 22, 2016 from PCT Patent Application No. PCT/US2015/064173, 13 pages.
Response filed Mar. 3, 2016 to the Non-Final Office Action mailed Dec. 10, 2015 from U.S. Appl. No. 14/606,979, 16 pages.
International Search Report and Written Opinion mailed Apr. 12, 2016 from PCT Patent Application No. PCT/US2016/013815, 19 pages.
Non-Final Office Action mailed Apr. 12, 2016 from U.S. Appl. No. 14/555,184, 32 pages.
Response filed Aug. 26, 2016 to the Final Office Action mailed Jun. 1, 2016 from U.S. Appl. No. 14/606,979, 15 pages.
Applicant-Initiated Interview Summary mailed Aug. 29, 2016 from U.S. Appl. No. 14/606,979, 3 pages.
Non-Final Office Action and Examiner Initiated Interview Summary mailed Sep. 22, 2016 from U.S. Appl. No. 14/606,979, 27 pages.
Preliminary Amendment filed Sep. 26, 2016 from U.S. Appl. No. 15/239,417, 7 pages.
Response and Demand filed Apr. 6, 2016 from PCT Patent Application No. PCT/US2015/059799, 20 pages.
Second Written Opinion mailed Oct. 31, 2016 from PCT Patent Application No. PCT/US2015/059799, 8 pages.
Final Office Action mailed Oct. 14, 2016 from U.S. Appl. No. 14/538,775, 63 pages.
Interview Summary filed Oct. 11, 2016 from U.S. Appl. No. 14/606,979, 2 pages.
Second Written Opinion mailed Oct. 10, 2016 from PCT Patent Application No. PCT/US2015/060959, 7 pages.
Response filed Oct. 31, 2016 to the Final Office Action mailed Jul. 29, 2016 from U.S. Appl. No. 14/588,138, 10 pages.
Notice of Allowability mailed Oct. 24, 2016 from U.S. Appl. No. 14/555,184, 11 pages.
Corrected Notice of Allowability mailed Oct. 31, 2016 from U.S. Appl. No. 14/555,184, 6 pages.
Response filed Nov. 28, 2016 to the Written Opinion mailed Apr. 12, 2016 from PCT Patent Application No. PCT/US2016/013815, 10 pages.
Corrected Notice of Allowability mailed Nov. 21, 2016 from U.S. Appl. No. 14/555,184, 6 pages.
Response filed Dec. 8, 2016 to the Second Written Opinion mailed Oct. 31, 2016 from PCT Patent Application No. PCT/US2015/059799, 12 pages.
International Search Report and Written Opinion mailed Nov. 14, 2016 from PCT Patent Application No. PCT/US2016/048898, 16 pages.
International Preliminary Report on Patentability mailed Nov. 29, 2016 from PCT Patent Application No. PCT/US2015/064173, 6 pages.
Response filed Dec. 7, 2016 to the Second Written Opinion mailed Oct. 10, 2016 from PCT Patent Application No. PCT/US2015/060959, 8 pages.
Response filed Dec. 13, 2016 to the Non-Final Office Action mailed Sep. 22, 2016 from U.S. Appl. No. 14/606,979, 22 pages.
Applicant-Initiated Interview Summary mailed Dec. 20, 2016 from U.S. Appl. No. 14/538,775, 3 pages.
Corrected Notice of Allowability mailed Dec. 14, 2016 from U.S. Appl. No. 14/555,184, 6 pages.
Amended claims filed Dec. 22, 2016 from PCT Patent Application No. PCT/US2015/059798, 6 pages.
Response filed Jan. 3, 2017 to the Final Office Action mailed Oct. 14, 2016 from U.S. Appl. No. 14/538,775, 9 pages.
Non-Final Office Action mailed Jan. 6, 2017 from U.S. Appl. No. 14/866,697, 72 pages.
Second Written Opinion mailed Jan. 2, 2017 from PCT Patent Application No. PCT/US2016/013815, 6 pages.
Non-Final Office Action mailed Jan. 20, 2017 from U.S. Appl. No. 14/588,138, 12 pages.
Notice of Allowance mailed Feb. 3, 2017 from U.S. Appl. No. 14/555,184, 18 pages.
International Preliminary Report on Patentability mailed Jan. 30, 2017 from PCT Patent Application No. PCT/US2015/059798, 6 pages.
Final Office Action mailed Feb. 24, 2017 from U.S. Appl. No. 14/538,775, 42 pages.
International Preliminary Report on Patentability mailed Jan. 24, 2017 from PCT Patent Application No. PCT/US2015/059799, 8 pages.

* cited by examiner

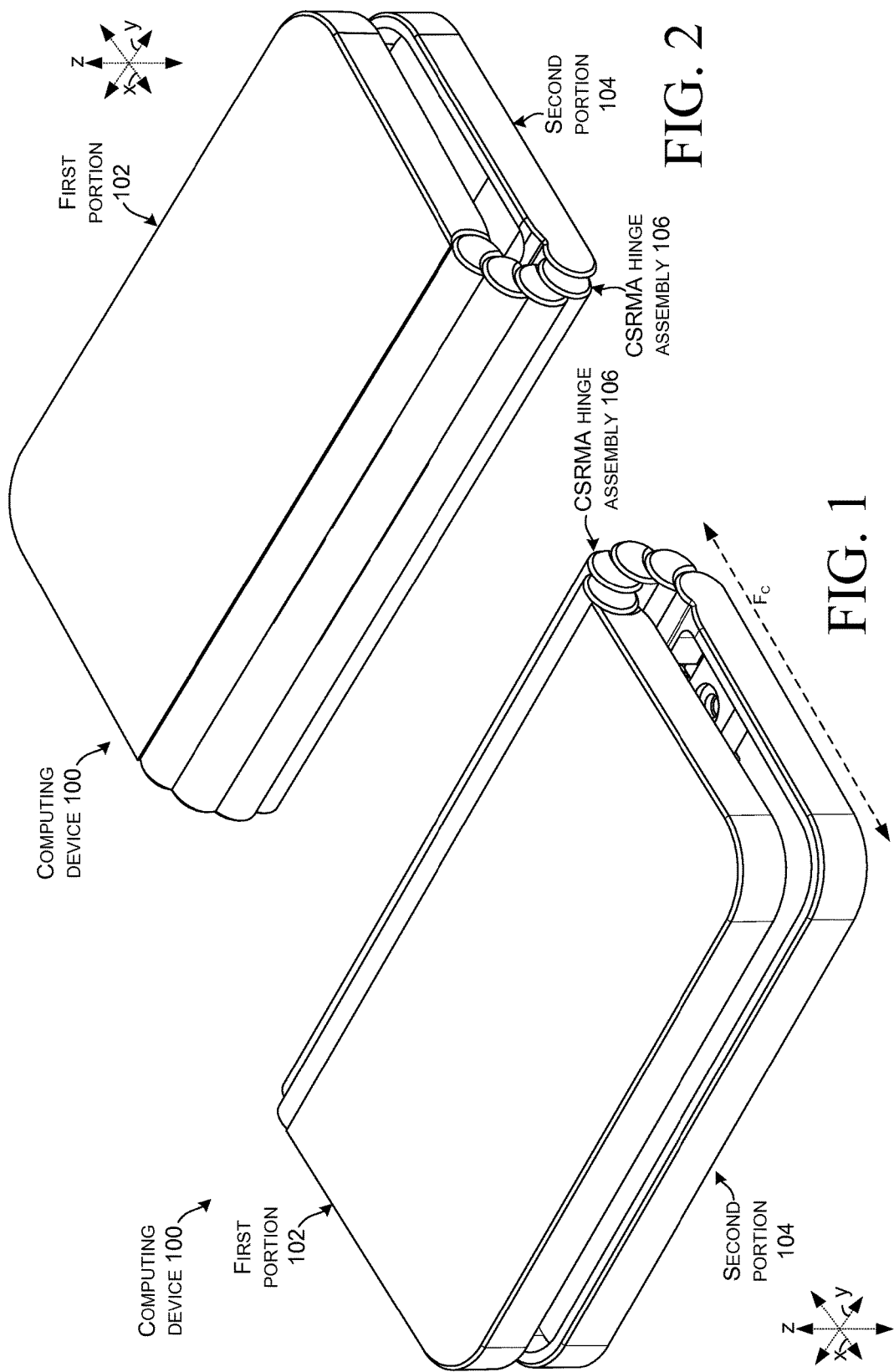

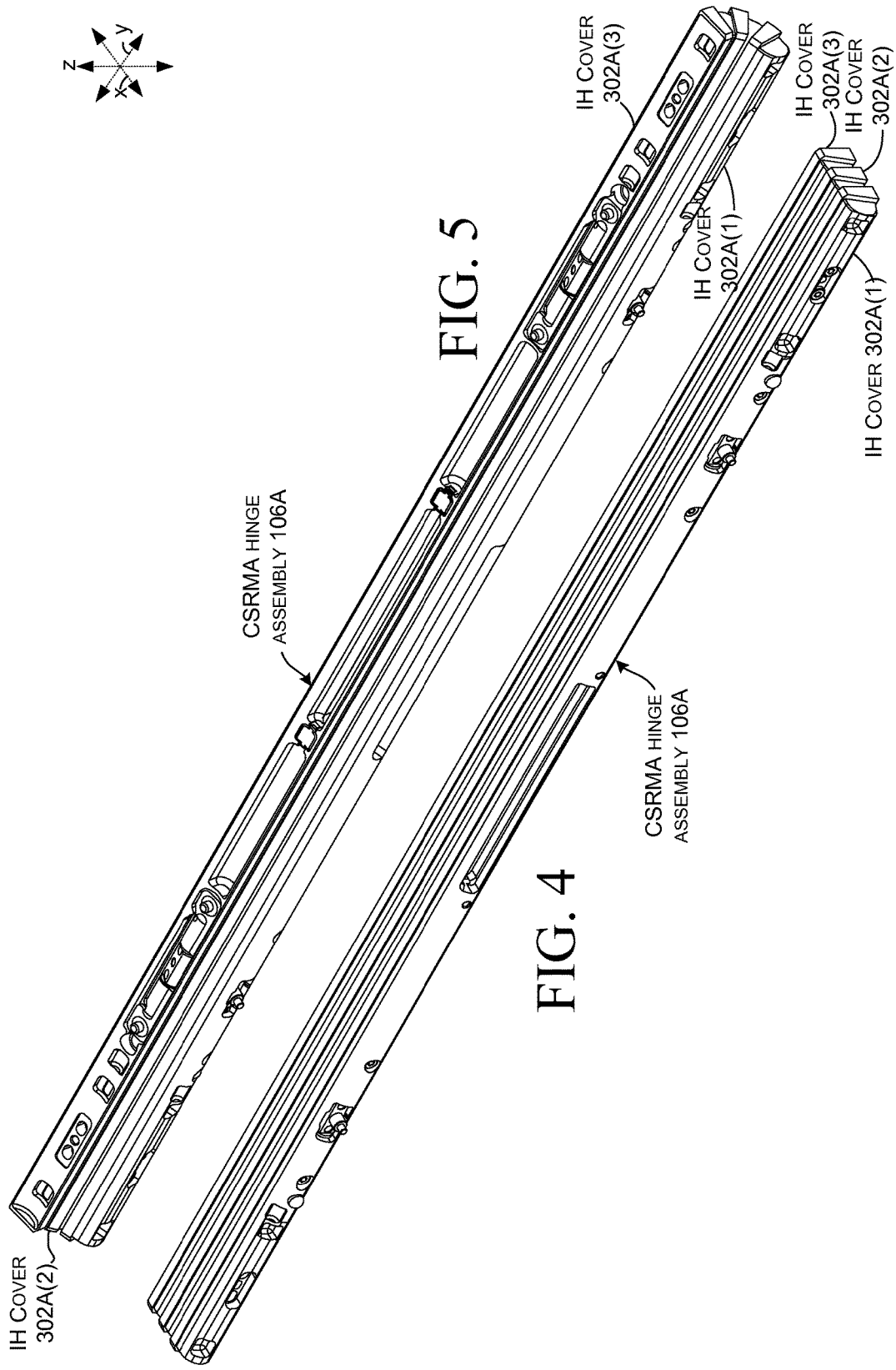

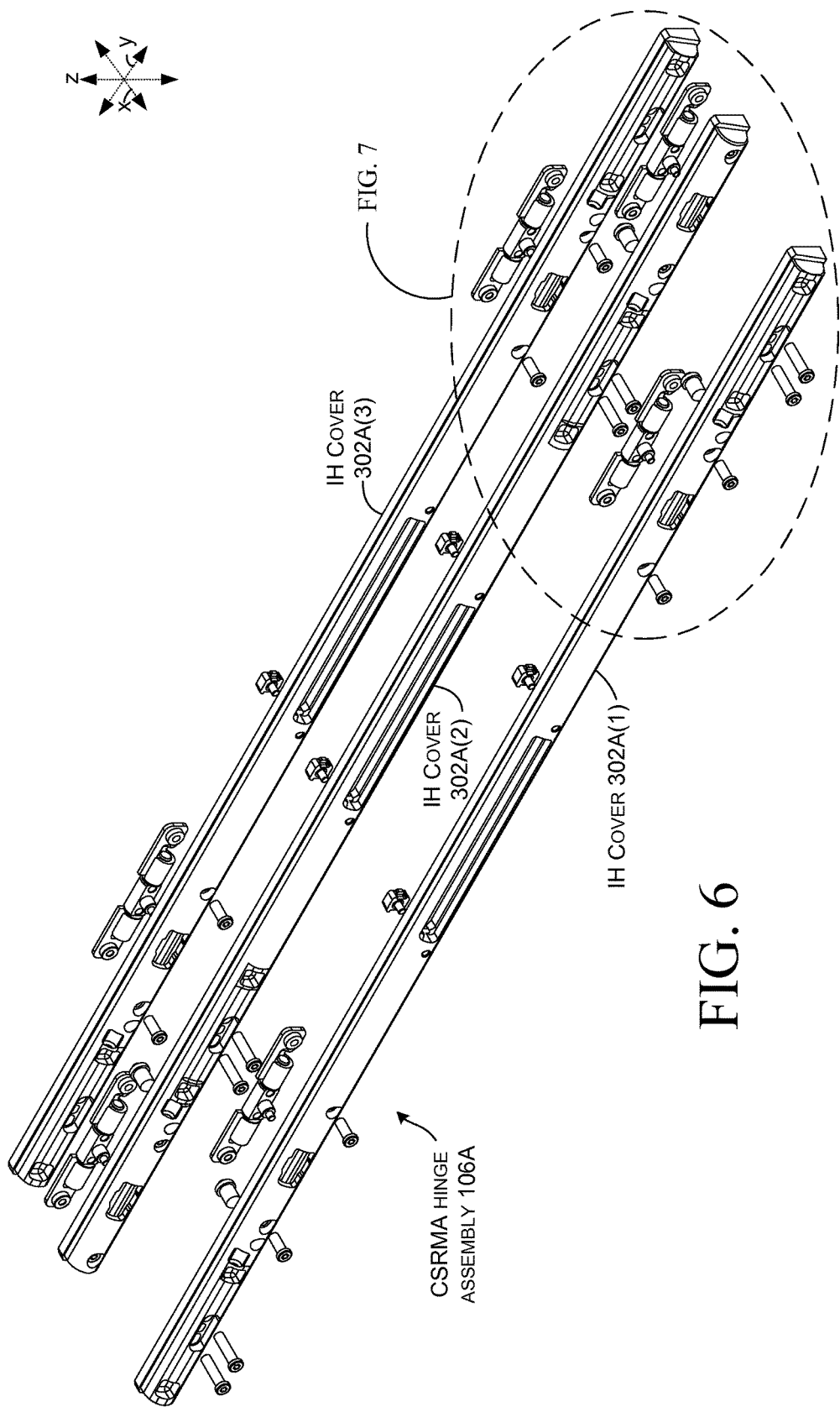

COVERED MULTI-PIVOT HINGE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1-2 show perspective views of an example device that includes a covered, sequentially rotating, multi-axis hinge assembly example in accordance with some implementations of the present concepts.

FIGS. 4-5 show perspective views of a covered, sequentially rotating, multi-axis hinge assembly example in accordance with some implementations of the present concepts.

FIG. 6 shows an exploded perspective view of a covered, sequentially rotating, multi-axis hinge assembly example in accordance with some implementations of the present concepts.

DESCRIPTION

The present concepts relate to computing devices employing multi-axis or multi-pivot hinges to rotatably secure portions of the computing device. The multi-pivot hinges can include hinge covers that can function to both protect the hinge from the user and the user from the hinge. The hinge covers can also contribute structurally to the hinge functionality and thus the hinge covers can be thought of as integrated with the multi-pivot hinges in that they (e.g., the hinge covers) can be dual function elements that contribute to both the hinge functionality and the hinge cover functionality. Further, some implementations can control a relative order in which individual hinges rotate. One such case can cause the hinges to operate in a predefined order from first to last (e.g., sequentially).

Figure 3:
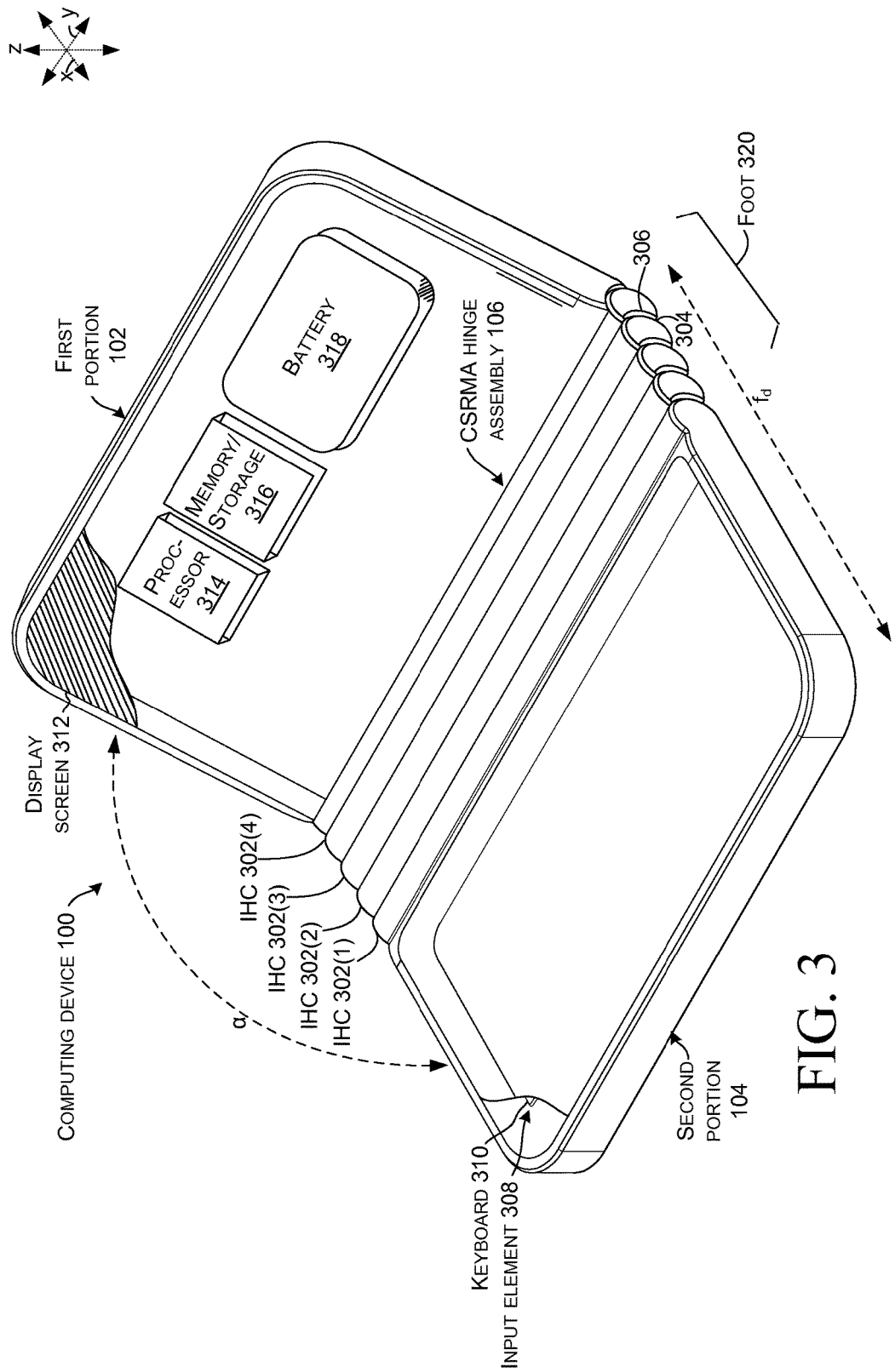
FIG. 3 shows a partial cut-away perspective view of an example device that includes a covered, sequentially rotating, multi-axis hinge assembly example in accordance with some implementations of the present concepts.

Introductory FIGS. 1-3 collectively show an example of a computing device 100. In this example, computing device 100 has first and second portions 102 and 104 that are rotatably secured together by a covered, sequentially rotating, multi-axis hinge assembly 106 (e.g., CSRMA hinge assembly). FIG. 1 shows the computing device 100 from the 'front' and FIG. 2 shows the computing device from the 'back.' FIGS. 1 and 2 show the computing device in a 'closed' or 'storage' position where the first and second portions are oriented relatively parallel to one another and juxtaposed relative to one another. In this case, the second portion 104 can be configured to be positioned on a generally horizontal surface (not specifically designated) and the first and second portions are generally parallel to one another and the horizontal surface. Note that in the closed position the CSRMA hinge assembly 106 can provide a footprint $f_c$ that is compact and easy to carry. The footprint is discussed more below relative to FIG. 3.

FIG. 3 shows a partial cut-away perspective view of computing device 100 in an 'open' or 'deployed' position. In this example, in the deployed position, the first and second portions define an obtuse angle α relative to one another, as opposed to an angle close to zero in the closed position of FIGS. 1-2.

Aspects of the CSRMA hinge assembly 106 are described in more detail below. The CSRMA hinge assembly can include a set of integrated hinge covers 302. In this implementation, adjacent integrated hinge covers can overlap one another to obscure the underlying elements during rotation. The integrated hinge covers 302 are integrated in that they function as hinge covers that are also structural hinge elements. Stated another way, the integrated hinge covers can be integral to the hinge function as well as functioning as hinge covers.

This example includes four integrated hinge covers 302. Other examples may include two, three, or five or more integrated hinge covers. In the illustrated configuration, individual integrated hinge covers 302 can be generally elongate (e.g., extending along a long axis relative to the y axis). Individual integrated hinge covers can also include a generally convex surface 304 and a generally opposing concave surface 306 (not all of the convex and concave surfaces are designated with particularity). The concave and convex surfaces can overlap and can allow rotational interaction between adjacent integrated hinge covers when the concave surface of one cover rotates relative to the convex surface of an adjacent integrated hinge cover.

In this case the computing device 100 can also include an input element or device 308. In this example the input device 308 is manifest as a keyboard 310. Other implementations can employ other input devices. In this example, the computing device can also include a display screen 312, such as a touch sensitive display screen. The computing device can also include a processor 314, memory/storage 316, and/or a battery 318, among other components. These elements can be positioned in the first portion 102 and/or second portion 104.

CSRMA hinge assembly 106 can be secured to the first and second portions 102 and 104 to allow rotation therebetween. The CSRMA hinge assembly 106 can be secured to the first and second portions in a relatively permanent manner (e.g., in a manner that is not intended to be readily separable by an end use consumer). Alternatively, the CSRMA hinge assembly 106 can be secured to the first and second portions in a relatively quickly attachable/detachable manner (e.g., in a manner that is intended to be readily separable by the end use consumer). One such example of this latter configuration is described below in more detail relative to FIG. 12.

Note also, that this implementation of the CSRMA hinge assembly 106 is a progressive or sequential hinge that can increase a footprint of the computing device when the device is transitioned from the closed position of FIGS. 1-2 to the open position of FIG. 3. For example, compare the closed footprint $f_c$ to the open or deployed footprint $f_d$. This extended footprint feature can be especially valuable in this implementation where some or all of the electronic components, such as the display 312, processor 314, memory/ storage 316, and battery 318 are positioned in the first portion 102. The extended footprint provided by the CSRMA hinge assembly can increase stability of the computing device and reduce the likelihood of the device tipping over backward in the deployed position from the weight of these components. This progressive or sequential nature of the CSRMA hinge assembly is described in more detail below relative to FIG. 9. Stated another way, the sequential nature of the CSRMA hinge assembly 106 can create a foot 320 in the deployed position that can help stabilize the computing device 100 and decrease tipping (e.g., maintain the center of mass over the footprint).

FIGS. 4-7 collectively show an example CSRMA hinge assembly 106A. FIG. 4 shows the CSRMA hinge assembly 106A in the opened or deployed position and FIG. 5 shows the CSRMA hinge assembly 106A in the closed position. FIG. 6 shows an exploded view of the open position shown in FIG. 4. Three integrated hinge covers 302A are shown in these FIGS. The integrated hinge covers can be thought of as integrated in that in addition to the cover functionality the covers contribute to the hinge functionality.

Figure 7:
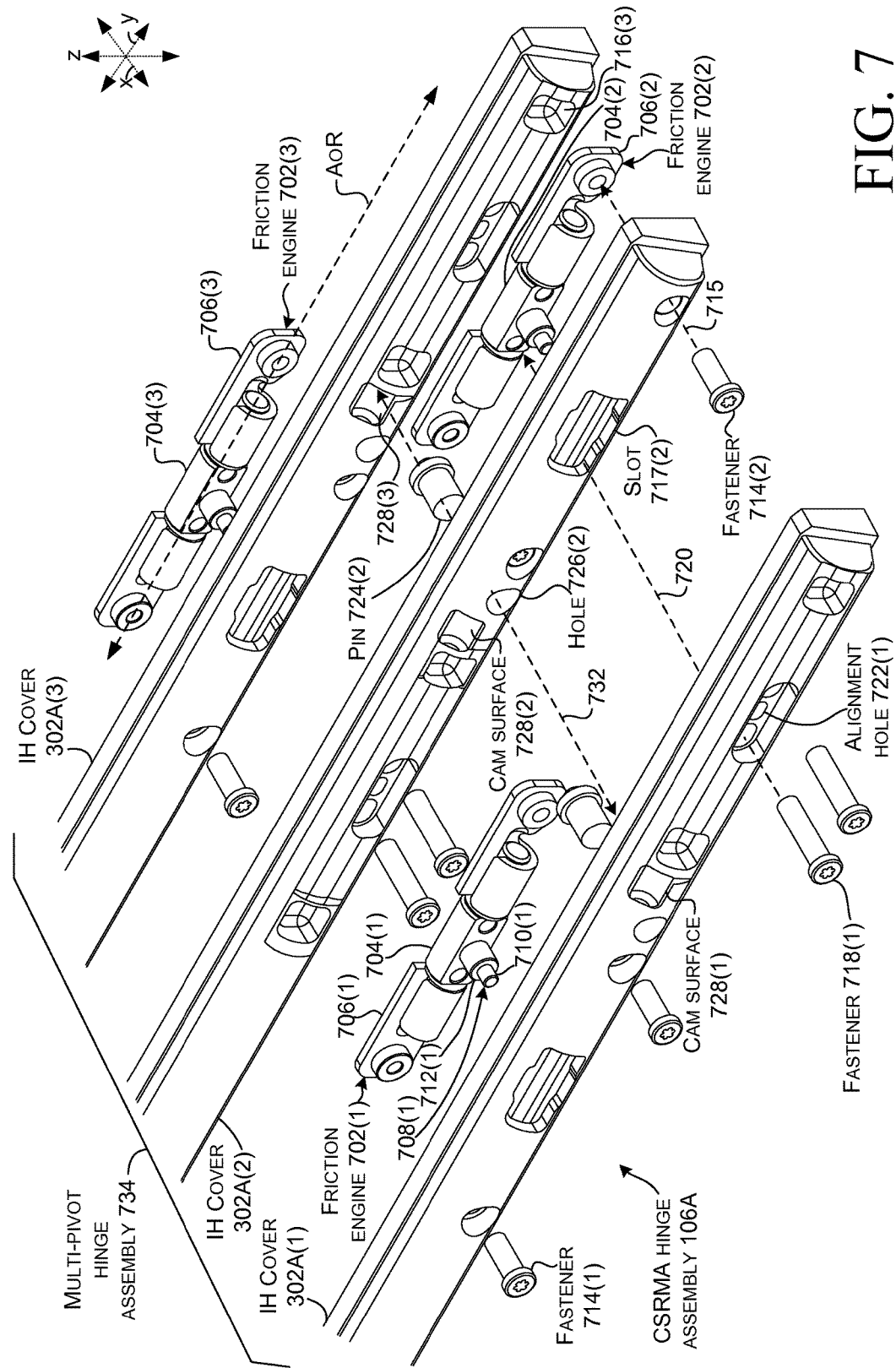
FIG. 7 shows an exploded perspective view of a portion of the covered, sequentially rotating, multi-axis hinge assembly example of FIG. 6.
Figure 8:
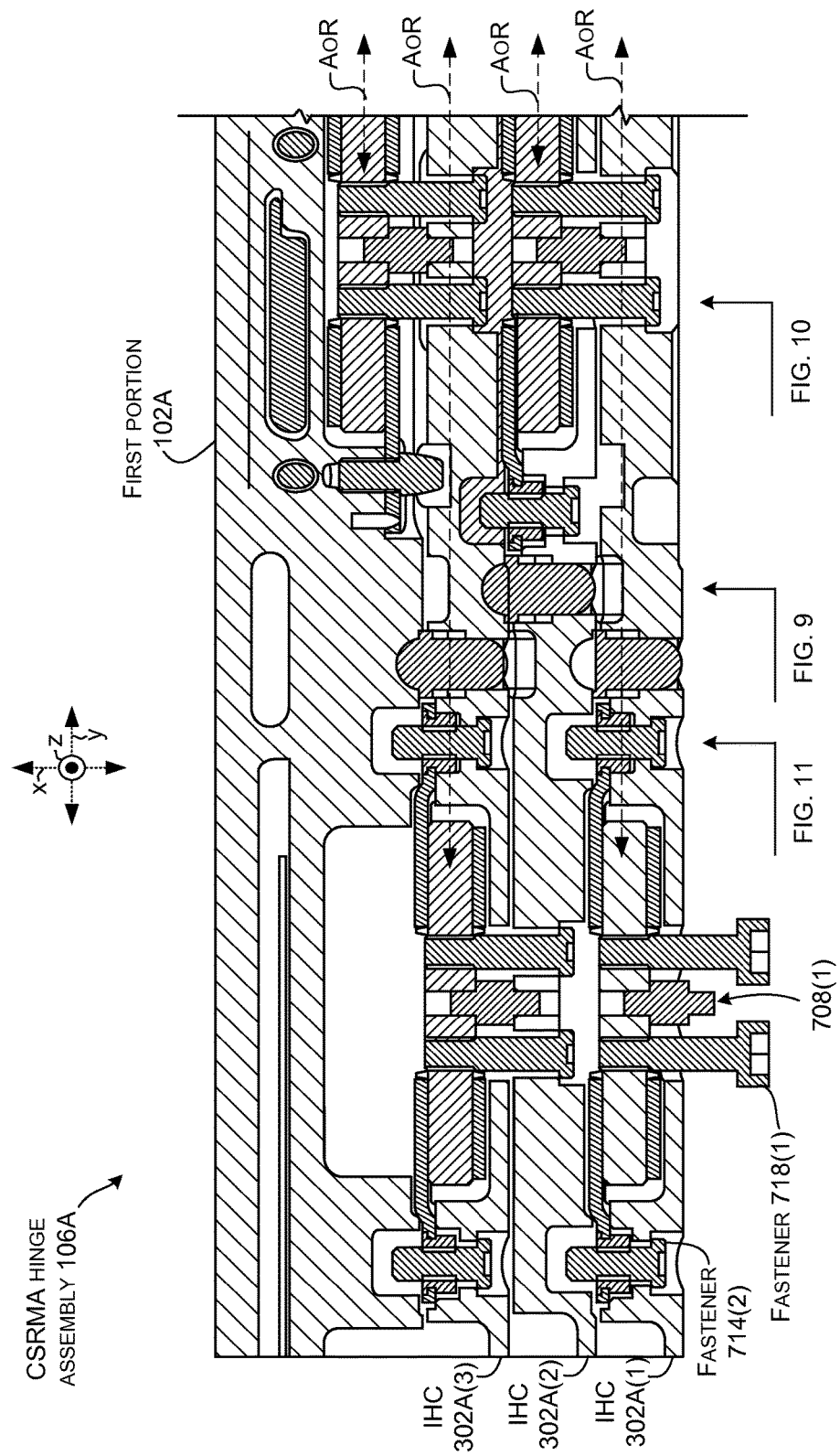
FIGS. 8-11 are sectional views of covered, sequentially rotating, multi-axis hinge assembly examples in accordance with some implementations of the present concepts.

FIGS. 7-8 collectively show additional detail of portions of CSRMA hinge assembly 106A. FIG. 7 shows an enlarged portion of the CSRMA hinge assembly 106A as indicated in FIG. 6. (Note that it is not practical due to space constraints on the drawing page to designate every instance of every element. Care has been taken to label at least one instance of each element in respect to each cover 302). FIG. 8 shows a sectional view taken along the xy reference plane.

Referring to FIG. 7, the illustrated CSRMA hinge assembly 106A includes rotation elements in the form of friction engines 702 for positioning relative to respective covers 302A. The friction engines 702 can include a friction shaft 704 riding on friction bands 706. The friction shaft 704 can define the axis of rotation (AoR) (e.g., hinge axis) for the friction engine. One such axis of rotation is labeled relative to friction engine 702(3) in FIG. 7 and four axes of rotation are labeled in FIG. 8. While specific rotation elements are shown and described, other rotation elements that can provide rotation around an axis of rotation and can operate cooperatively with other rotation elements are contemplated.

In this implementation, the friction shaft 704 can include a centering pin 708 (labeled only relative to friction engine 702(1) due to space constraints on the drawing page). The centering pin 708 can have first and second diameters 710 and 712. First fasteners 714 can secure the friction bands 706 of the friction engine 702 to a respective integrated hinge cover 302A as indicated by arrow 715. A void 716 can be formed in the integrated hinge cover behind the friction engine 702 to prevent any portion of the first fastener that passes through the friction engine 702 from binding on the integrated hinge cover 302A behind the friction engine and thereby limiting rotation of the friction engine. This aspect is described in more detail below relative to FIG. 11.

During assembly, the centering pin 708 can pass through the respective integrated hinge cover 302A via a slot 717. Second fasteners 718 can secure the friction shaft 704 of friction engine 702 to an adjacent integrated hinge cover 302A (e.g., the second fasteners can rotatably interconnect adjacent integrated hinge covers). For instance, relative to integrated hinge cover 302A(2), the friction shaft 704(2) can be secured to adjacent integrated hinge cover 302A(1) by second fastener 718(1) as indicated by arrow 720. During this process, the centering pin 708 (only labeled relative to friction engine 702(1)) of friction engine 702(2) can pass through slot 717(2) in integrated hinge cover 302A(2) and orient the friction engine relative to integrated hinge cover 302A(1) by the first diameter 710(2) engaging alignment hole 722(1) in integrated hinge cover 302A(1). The transition between the first and second dimensions 710 and 712 can create a 'shoulder' that limits compression of the friction shaft 704 against the adjacent integrated hinge cover 302A.

The relative dimension of the centering pin's second diameter 712(2) to the height of the slot 717(2) in the z reference direction can define a range of motion of the friction engine 702(2). Similarly, the height of the slot in the z reference direction relative to the second fastener 718(1) can define the range of motion (e.g., degrees of rotation) of the friction engine 702(2) (e.g., the profile of the slot is such that the second fastener 718(1) and the second diameter 712(2) of the centering pin 708 strike the cover 302A(2) at the same time). This aspect is described in more detail below relative to FIG. 9.

Sequencing pin 724 can ride in a hole 726 in integrated hinge cover 302A and engage cam surfaces 728 and 730 of adjacent integrated hinge cover 302A as indicated by arrow 732. In this view only cam surfaces 728 are visible. However, this aspect is discussed in more detail below relative to FIG. 9 where both cam surfaces 728 and 730 are visible and labeled.

Note that the exploded view of FIGS. 6 and 7 show other hinge elements besides the integrated hinge covers 302A. In contrast, in the assembled views of FIGS. 1-3, the integrated hinge covers effectively cover and obscure the other hinge elements. Covering the other hinge elements can protect the other hinge elements from damage, such as from a foreign object like a pen or zipper that might get caught in the hinge elements during rotation and damage the hinge elements. Similarly, without the protection offered by the integrated hinge covers, the user could get pinched by the other hinge elements during hinge rotation. Further, the integrated hinge covers can create a more aesthetically pleasing hinge appearance and thereby an overall aesthetically pleasing computing device appearance.

When considering the illustrated elements of FIG. 7 from one perspective, the integrated hinge covers 302A can be combined with the other hinge elements to form the CRSMA hinge assembly 106A. Thus, the other hinge elements can be considered as a multi-pivot hinge assembly 734 that when combined with the integrated hinge covers 302A can form the CRSMA hinge assembly 106A.

Figure 9:
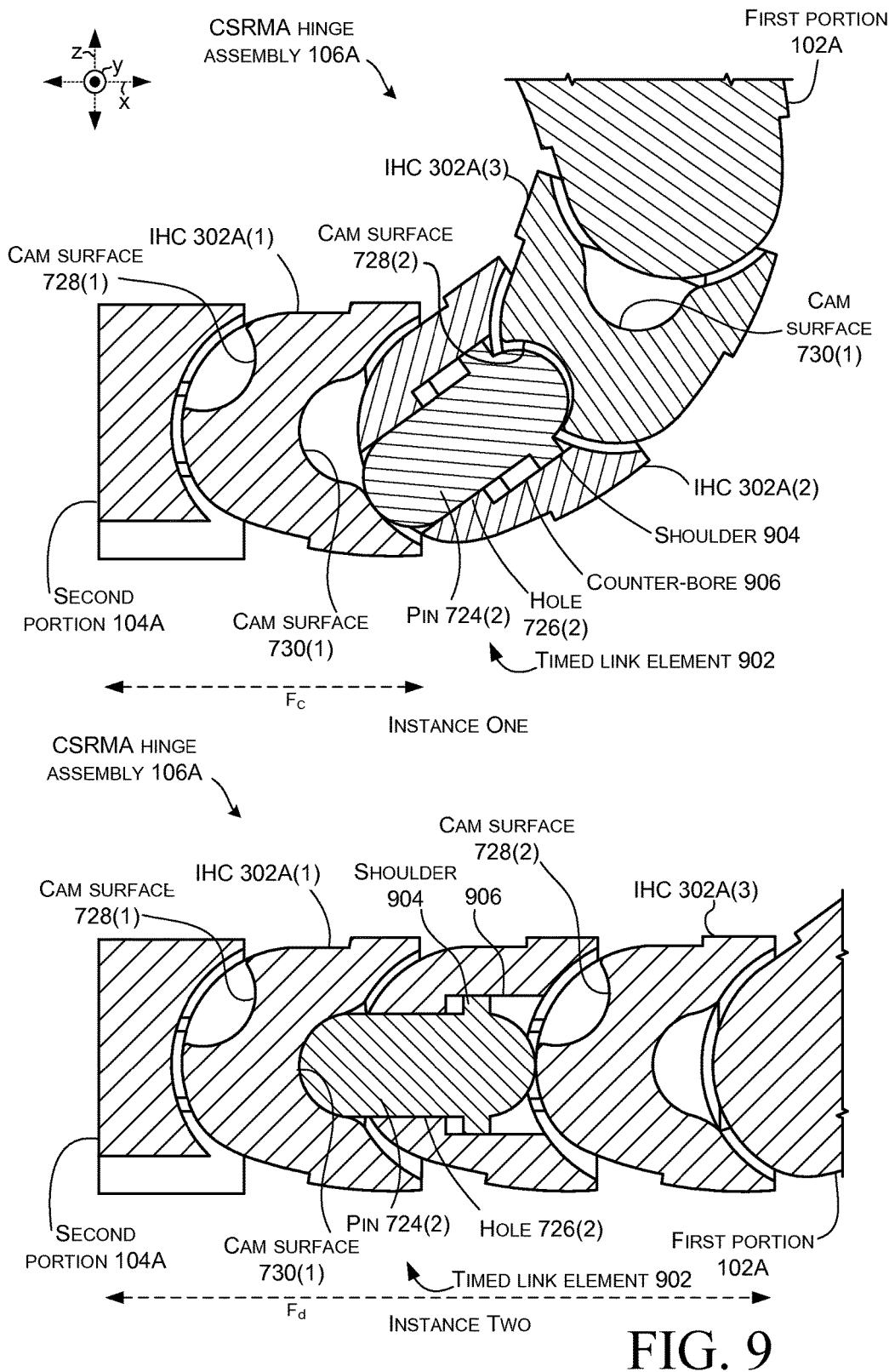
Figure 10:
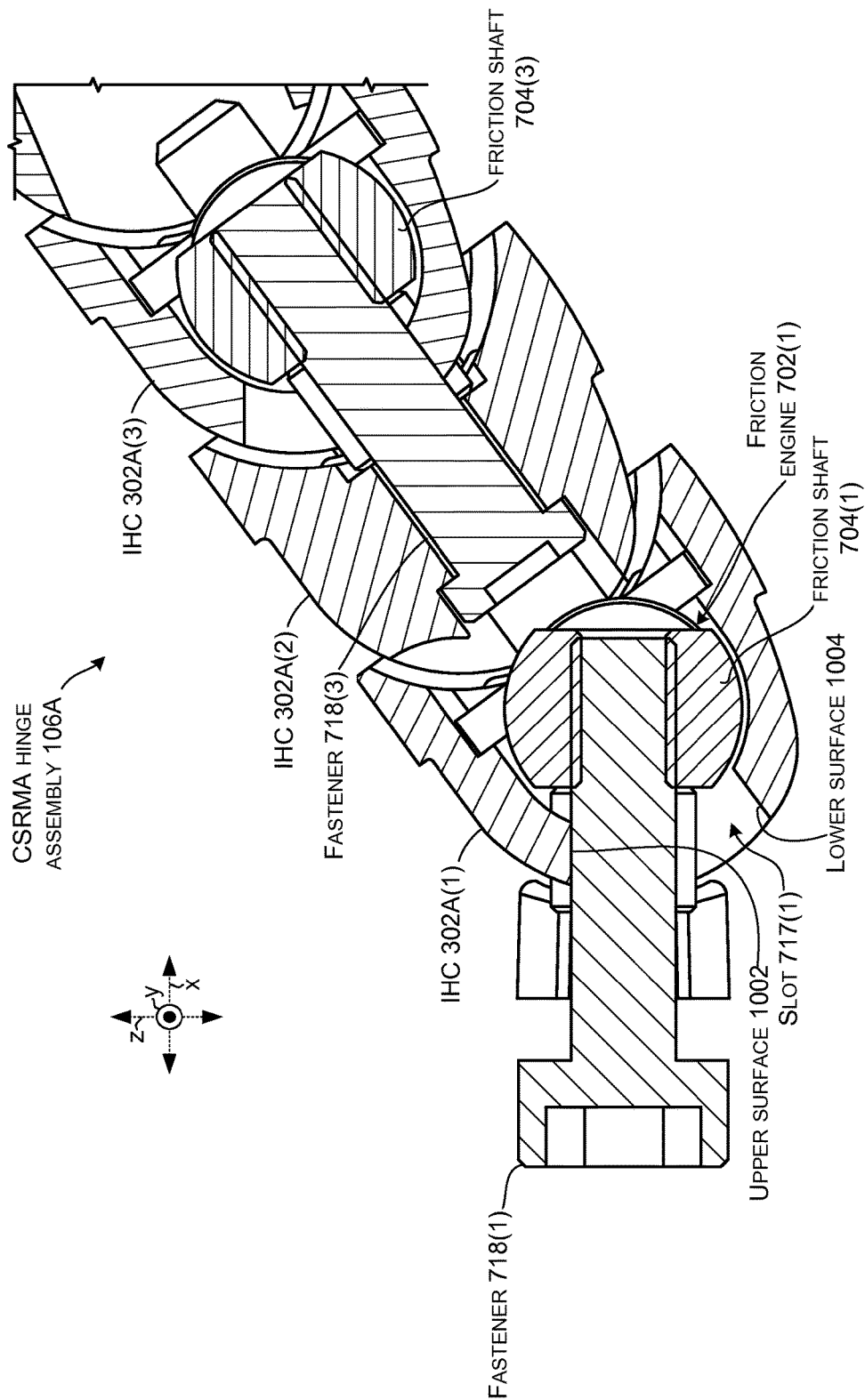
Figure 11:
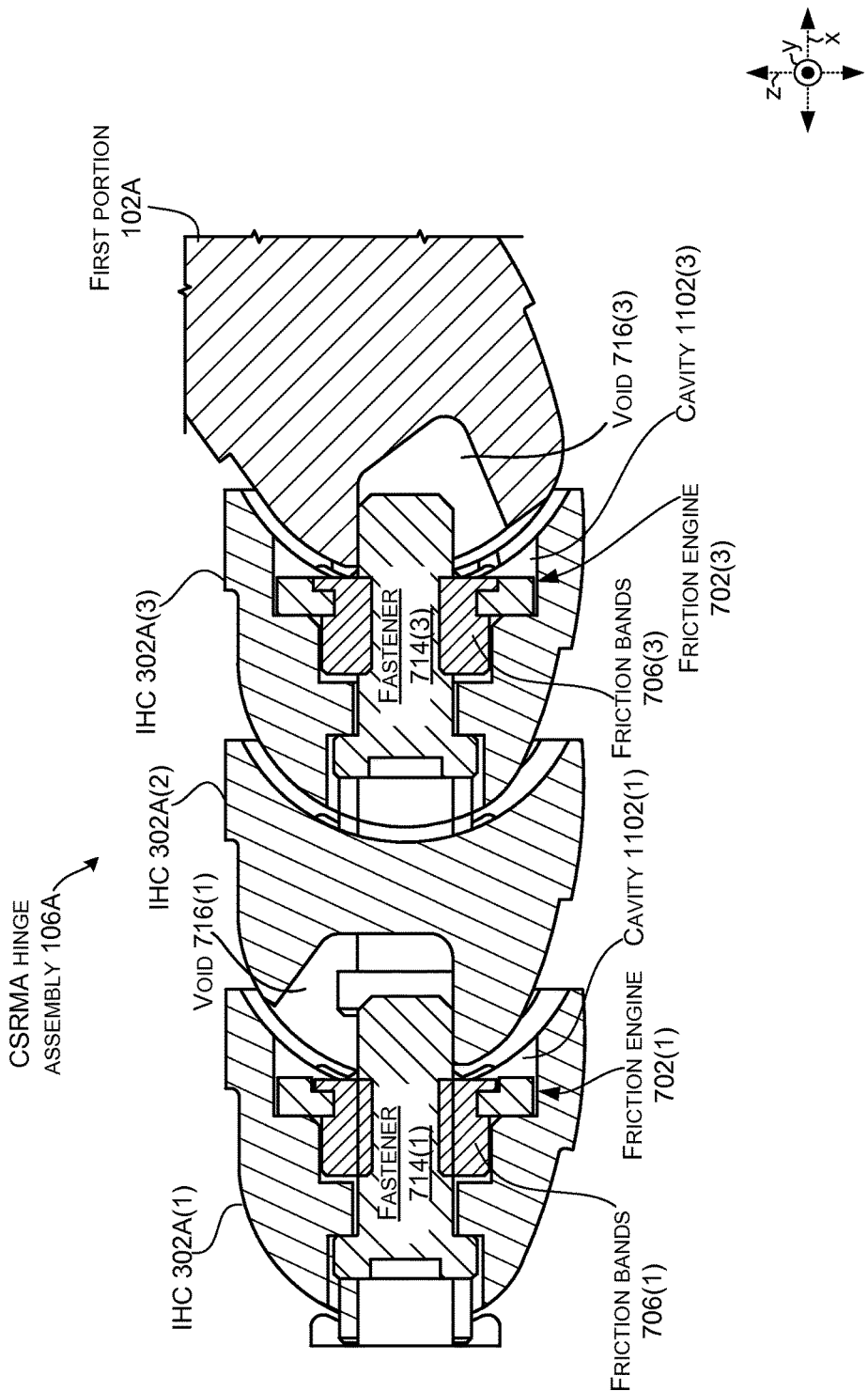

FIGS. 9-11 show sectional views through the xz reference plane as indicated in FIG. 8, and are discussed collectively below.

For purposes of explanation, FIG. 9 shows two instances of CRSMA hinge assembly 106A. Instance One shows a partially closed position similar to FIG. 1. Instance Two is a partially deployed position similar to FIG. 3. The point of interest illustrated in FIG. 9 is the sequential nature of the CRSMA hinge assembly starting proximate to second portion 104A and progressing toward first portion 102A. In this case, rotation of the integrated hinge covers 302A starts with cover 302A(1), which in Instance One has already turned and is oriented parallel to the x reference direction. At this point, integrated hinge cover 302A(2) can rotate. However, pin 724(2) prevents integrated hinge cover 302A(3) from rotating. Stated another way, pin 724(2) is engaging cam surface 728(2) and integrated hinge cover 302A(3) cannot rotate because the pin cannot evacuate away from cam surface 728(2). Since the pin 724(2) cannot move forward (in the positive x reference direction), engagement of the pin in the cam surface 728(2) prevents rotation of integrated hinge cover 302A(3). As integrated hinge cover 302A(2) rotates into the horizontal position (e.g., similar to integrated hinge cover 302A(1)) the pin 724(2) can move forward (e.g., can be cammed forward by cam surface 728(2)) to evacuate away from cam surface 728(2) until the pin engages cam surface 730(1). At this point the pin 724(2) is no longer blocking integrated hinge cover 302A(3) and rotation can continue to the point shown in Instance Two.

While not shown in this view due to the offset nature of the pins 724, but illustrated relative to FIG. 8, the process can then repeat with another pin 724 positioned in integrated hinge cover 302A(3) and camming integrated hinge cover 302A(2) and first portion 102A. Thus, from one perspective, the pins 724 in combination with cam surfaces 728 and 730 can be thought of as examples of timing elements or timed link elements 902 that control the sequential nature of the CSRMA hinge assembly (e.g., the order of rotation around the individual hinge axes). Thus, the integrated hinge covers 302A can be thought of as hinged or linked elements and the timed link elements 902 can define the relative movements of the linked elements.

Note that the sequential nature of the CSRMA hinge assembly 106A increases footprint (e.g., length) from $f_c$ in the closed position of Instance One to $f_d$ in the deployed position of Instance Two. This aspect was introduced above relative to FIGS. 1-3.

Also note that FIG. 9 shows that in this implementation, pin 724(2) can have a shoulder 904 that has an outside diameter that is slightly smaller than a partial counter bore 906 formed in hole 726(2) in integrated hinge cover 302A(2). The shoulder and counter bore can prevent pin 724(2) from falling out of the CSRMA hinge assembly 106A during the manufacturing process.

FIG. 10 shows how dimensions of slot 717 formed in integrated hinge cover 302A(1) can define a range of rotation of the friction engine 702. In this case, the dimensions are defined by the slot's upper surface 1002 and lower surface 1004. Recall that second fastener 718 is secured to the friction engine's friction shaft 704. The friction shaft 704 can rotate until the fastener 718 contacts the upper surface 1002 as illustrated. The friction shaft can rotate in the opposite direction through a defined range of motion or defined angle of rotation (e.g., number of degrees) until the fastener 718 contacts the lower surface 1004. The defined range of the individual slots multiplied by the number of integrated hinge covers can define the range of rotation of the CSRMA hinge assembly 106A. For instance, four integrated hinge covers having defined ranges of 45 degrees would provide overall hinge rotation of 180 degrees.

FIG. 11 shows another view of CSRMA hinge assembly 106A. This view shows first fasteners 714 securing friction bands 706 to integrated hinge cover 302A. For instance, the fastener 714(1) can secure integrated hinge cover 302A(1) to friction bands 706(1) of friction engine 702(1). Voids 716(1) formed in line with fasteners 714(1) (e.g. in the x reference direction) can avoid situations where the fasteners inadvertently limit rotation of the friction engine relative to integrated hinge cover 302A(2) by the fastener binding on or otherwise contacting integrated hinge cover 302A(2). Stated another way, the voids 716 and/or other elements can be utilized to avoid rigidly (e.g., non-rotatably) fastening integrated hinge cover 302A(1) to integrated hinge cover 302A(2) and/or integrated hinge cover 302A(2) to integrated hinge cover 302A(3).

Note that in this implementation, individual integrated hinge covers 302A can define a cavity 1102. As illustrated relative to integrated hinge cover 302A(3), friction engine 702(3) is positioned within the cavity 1102(3). Further, first fastener 714(3) can serve to secure a non-moving portion of the friction engine (e.g., friction bands 706(3)) to integrated hinge cover 302A(3). Second fasteners 718(3) (see FIG. 10) can serve to secure a rotating portion (e.g., friction shaft 704(3)) to the adjacent integrated hinge cover 302A(2) to allow rotation between integrated hinge cover 302A(2) and integrated hinge cover 302A(3). Thus, these hinge components can be contained within the integrated hinge covers and/or pass between integrated hinge covers through the overlapping regions (e.g. convex surface of one hinge cover overlapping the concave surface of the adjacent integrated hinge cover).

Viewed from one perspective, the above description provides great detail regarding structural elements of CSRMA hinge assembly implementations that employ a sequential hinge that uses sliding pins that cam off opposing covers to lock and unlock pins so that a multi-pivot hinge can roll and unroll in a controlled sequential manner that enables the hinge to be used as a foot to support a laptop or other device. The unrolling action can move the device fulcrum backwards providing a longer wheel base or foot print for the device in turn making the device less likely to tip over when a user interacts with the touch screen, for example.

Thus, some of the present implementations can be characterized as employing a multi-pivot hinge that includes multiple pivots (e.g., pivot axes) and links between integrated hinge covers. A sliding lock between each pivot and link can be moved into position via camming action embedded within the link that forces a lock fore and aft (e.g., in the x reference direction) to lock and unlock adjacent links. The locks can be staggered in adjacent integrate hinge covers to enable progressive communication between links.

Having the ability to lock links and to have only one active pivot at a time can allow for different torque values to be enabled at different rotation zones. In some implementations, this configuration can provide higher torque when opening a closed device and also when at the working or deployed angle (>90 degrees). The display moment is highest when the display is close to horizontal or when a touch force is being applied to it. These are the scenarios that tend to require higher torque, while the middle range (36-105 degrees) can be low torque zones as the display moment is low and user touch force does not tend to be a factor at these angles.

From one perspective, multiple friction hinges can be arranged in series with a staggered formation on either side of the device in a CSRMA hinge assembly. Mechanical stops (e.g., upper surface 1002 and lower surface 1004 of FIG. 10) can be built in to limit travel in both directions for axis of rotation. Sliding locking or linking elements (e.g., pins 724) can sequentially lock and unlock individual axes or rotation so that only one axis of rotation can rotate at a time. Where additional support is desired, spacers (such as plastic spacers) can be employed between each hinge cover to reduce and/or prevent adjacent integrated hinge covers from rubbing against each other.

Figure 12:
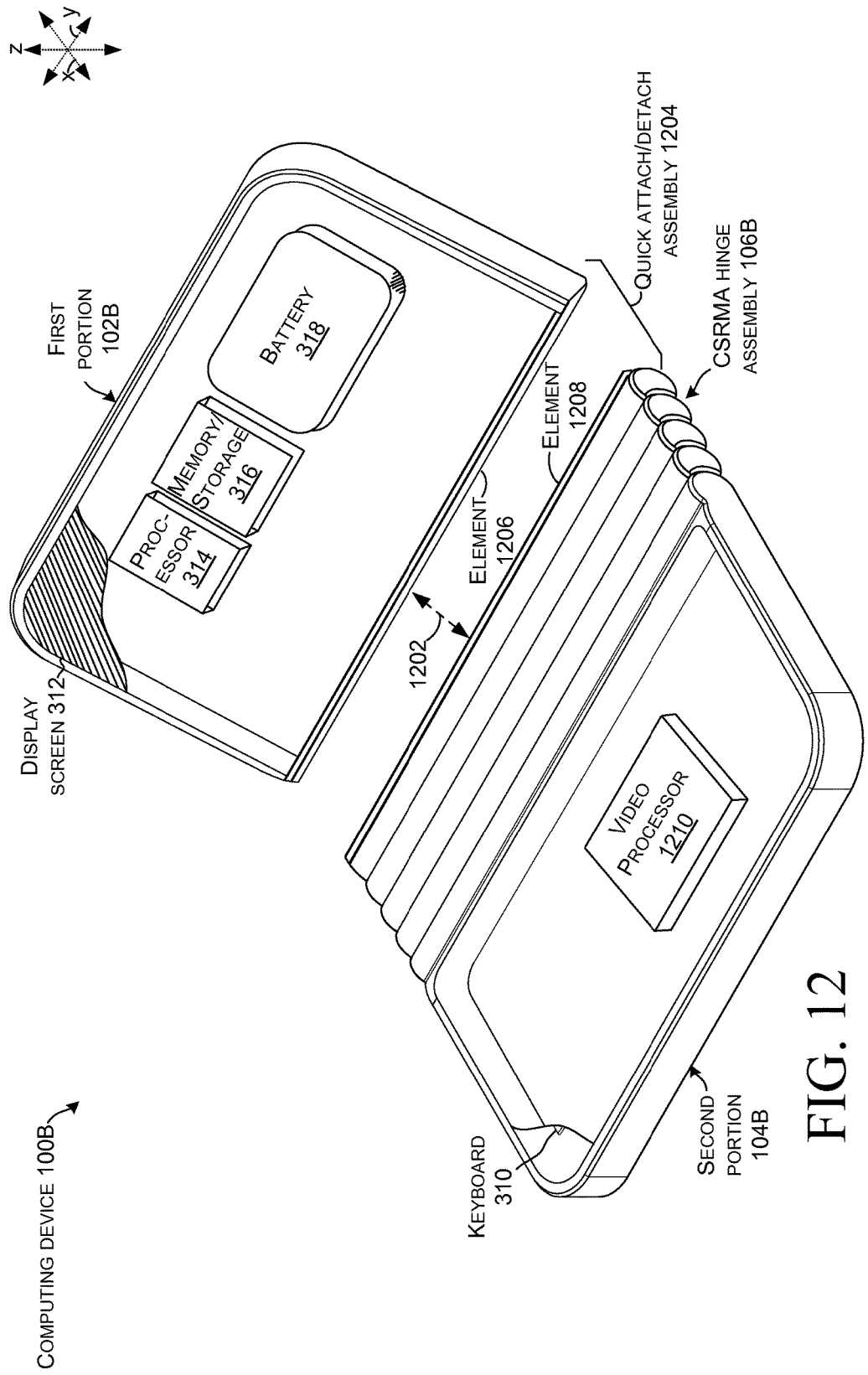
FIG. 12 shows another partial cut-away perspective view of an example device that includes a covered, sequentially rotating, multi-axis hinge assembly example in accordance with some implementations of the present concepts.

FIG. 12 shows a view that is similar to the view of FIG. 3. In this case, computing device 100B includes first and second portions 102B and 104B that are rotatably secured by CSRMA hinge assembly 106B. In this example, the CSRMA hinge assembly 106B is configured to allow an end user consumer to easily detach either or both of the first and second portions 102B and 104B from the CSRMA hinge assembly 106B as indicated by arrow 1202. In this example the CSRMA hinge assembly 106B can include a quick attach/detach assembly 1204. The quick attach/detach assembly 1204 may include cooperatively operating elements 1206 and 1208 located on the first portion 102B and the CSRMA hinge assembly 106B, respectively.

In one example, element 1206 can be manifest as a latch and element 1208 can be manifest as a receiver. The latch can engage the receiver to removeably couple the first portion 102B with the CSRMA hinge assembly 106B. In another example, the elements 1206 and 1208 may magnetically couple to one another in a manner that can be overcome by the user to separate the first portion from the CSRMA hinge assembly. Other quick attach/detach assemblies 1204 are contemplated. Note further that alternatively or additionally to mechanically coupling the CSRMA hinge assembly 106B to the first and/or second portions, the quick attach/detach assembly 1204 can detachably electrically couple electronic components of the first and second portions. For instance, the quick attach/detach assembly 1204 may electrically couple processor 314, storage/memory 316, and/or battery 318 from the first portion 102B to a video processor 1210 in the second portion 104B.

Thus, the quick attach/detach assembly 1204 can allow the user to be able to detach first portion 102B or second portion 104B to use either portion independent of the other. For example, first portion 102B may be operated as a stand-alone tablet device, and then may be attached to second portion 104B via CSRMA hinge assembly 106B to form a device more akin to a laptop device. A user may also be able to exchange first portion 102B or second portion 104B for application-specific devices. For example, an individual second portion may include a keyboard and/or a touchscreen. In certain scenarios, the user may attach a first touchscreen as the first portion and a second touchscreen as second portion, and utilize the device like a book. In other scenarios, a user may attach a touchscreen as the first portion and an input device, comprising a keyboard and trackpad, as the second portion, and utilize the device like a laptop. Other configurations and implementations are contemplated.

Individual elements of the CSRMA hinge assembly can be made from various materials, such as sheet metals, die cast metals, and/or molded plastics, among others, or any combination of these materials.

CSRMA hinge assemblies can be utilized with any type of computing device, such as but not limited to notebook computers, smart phones, wearable smart devices, and/or other types of existing, developing, and/or yet to be developed computing devices.

EXAMPLE METHODS

Various methods of manufacture, assembly, and use for CSRMA hinge assemblies are contemplated beyond those shown above relative to FIGS. 1-12.

Additional Examples

Various examples are described above. Additional examples are described below. One example is manifest as a first portion and a second portion. The example can also include a set of rotatably interconnected elongate covers securing the first and second portions, individual elongate covers can define a cavity. The example can further include a multi-pivot hinge assembly comprising a set of hinge elements. An individual hinge element is positioned within the cavity of a first individual elongate cover and rotatably secured between the first individual elongate cover and a second adjacent elongate cover effective that the individual hinge element pivots around a hinge axis that is parallel to the elongate cover.

Any combination of the above and/or below examples where the individual elongate covers have a convex surface and an opposing concave surface that defines the cavity.

Any combination of the above and/or below examples where the convex surface of the first individual elongate cover is rotatably secured against the concave surface of the second adjacent elongate cover.

Any combination of the above and/or below examples where the rotation of the set of hinge elements is sequentially controlled by timing elements.

Any combination of the above and/or below examples where the timing elements are positioned within the first individual elongate cover and extend to the second adjacent elongate cover.

Any combination of the above and/or below examples where the hinge elements comprise friction engines.

Any combination of the above and/or below examples where the set of hinge elements is configured to be rotated from a storage position where the first portion is generally parallel to and above the second portion to a deployed position where the first portion is at an obtuse angle relative to the second portion.

Any combination of the above and/or below examples where the set of hinge elements is configured to sequentially rotate from the storage position to the deployed position starting with a first individual hinge element proximate to the second portion and proceeding only to a second adjacent individual hinge element when the first individual hinge element has completed a defined range of rotation.

Any combination of the above and/or below examples where the second portion defines a footprint of the computing device in the storage position as measured transverse the elongate covers and in the deployed position the set of rotatably interconnected elongate covers extends the footprint.

Any combination of the above and/or below examples where electronic components are positioned in the first portion and wherein the extended footprint stabilizes the computing device from tipping in the deployed position.

Another example is manifest as a first portion that includes a display screen and a second portion that includes an input device. The example can include a covered sequentially rotating multi-pivot hinge assembly rotatably securing the first portion and the second portion in a manner that extends a footprint of the computing device as the first portion is rotated away from the second portion.

Any combination of the above and/or below examples where the second portion is configured to be positioned on a horizontal surface and the first portion is configured to be rotated relative to the horizontal surface from a storage position to a deployed position. The extended footprint maintains a center of mass of the computing device above the extended footprint in the deployed position.

Any combination of the above and/or below examples where the second portion is configured to be positioned on a horizontal surface and the first portion is configured to be positioned over the second portion in a generally horizontal orientation and to be rotated relative to the horizontal surface to a deployed position that is obtuse to the horizontal surface. The extended footprint maintains a center of mass of the computing device above the extended footprint in the deployed position and wherein the covered sequentially rotating multi-pivot hinge assembly rotates around a set of hinge axes when the first portion is rotated from the horizontal orientation starting with a first hinge axis closest to the second portion and sequentially progressing to a second hinge axis farther from the second portion upon completion of a defined angle of rotation by the first hinge axis.

Any combination of the above and/or below examples where the covered sequentially rotating multi-pivot hinge assembly further comprises a set of overlapping covers.

Any combination of the above and/or below examples where the overlapping covers contribute to a rotation functionality of the covered sequentially rotating multi-pivot hinge assembly and a sequential timing functionality of the covered sequentially rotating multi-pivot hinge assembly.

Any combination of the above and/or below examples where a battery and a processor are positioned in the first portion.

Another example is manifest as a first portion and a second portion. The example can also include a multi-axis hinge assembly securing the first portion and the second portion. The multi-axis hinge assembly includes overlapping covers and timed link elements positioned in the overlapping covers that define an order of rotation of individual axes of the multi-axis hinge assembly.

Any combination of the above and/or below examples where the timed link elements define the order of rotation by limiting rotation initially to an individual axis of rotation nearest the second portion as the first and second portions are rotated away from one another and further limiting rotation initially to another individual axis of rotation nearest the first portion as the first and second portions are rotated toward one another.

Any combination of the above and/or below examples where a first individual timed link element interacts with first and second individual covers. The first individual timed link element blocks rotation of the second individual cover until the first individual cover has completed a defined angle of rotation.

Any combination of the above and/or below examples where the first and second individual covers are adjacent to one another or where a third individual cover is interposed between the first and second individual covers.

Any combination of the above and/or below examples further including a quick attach/detach assembly configured to removably couple the first portion to the multi-axis hinge assembly and/or the second portion to the multi-axis hinge assembly.

CONCLUSION

Although techniques, methods, devices, systems, etc., pertaining to covered hinge assemblies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computing device, comprising:
a first portion and a second portion; and,
a multi-axis hinge assembly rotatably securing the first portion and the second portion, the multi-axis hinge assembly including timed link elements that define an order of rotation of hinge axes of the multi-axis hinge assembly such that the multi-axis hinge assembly sequentially rotates starting around a first individual hinge axis of the hinge axes proximate to the second portion and proceeding only to a second individual hinge axis of the hinge axes when the first individual hinge axis has completed a defined range of rotation, the first individual hinge axis being between the second portion and the second individual hinge axis.

2. The computing device of claim 1, wherein the multi-axis hinge assembly further comprises a set of hinge covers.

3. The computing device of claim 1, wherein a storage position comprises the first portion being substantially parallel to and above the second portion and a deployed position comprises the first portion being at an obtuse angle relative to the second portion.

4. The computing device of claim 2, wherein the multi-axis hinge assembly further comprises a set of friction engines and wherein individual adjacent friction engines of the set of friction engines are coupled through intervening hinge covers of the set of hinge covers.

5. The computing device of claim 3, wherein the second portion defines a footprint of the computing device in the storage position as measured transverse to the hinge axes and in the deployed position the multi-axis hinge assembly extends the footprint of the computing device.

6. The computing device of claim 4, wherein individual timed link elements of the timed link elements extend through an individual hinge cover of the set of hinge covers and alternatively engage other individual hinge covers of the set of hinge covers positioned on opposing sides of the individual hinge cover of the set of hinge covers.

7. The computing device of claim 5, further comprising electronic components positioned in the first portion and wherein the extended footprint stabilizes the computing device from tipping in the deployed position.

8. A computing device, comprising:
a first portion that includes a display screen and a second portion that includes an input device; and,
a covered sequentially rotating multi-pivot hinge assembly rotatably securing the first portion and the second portion, the covered sequentially rotating multi-pivot hinge assembly comprising a set of timed link elements that control a sequence of rotation such that the covered sequentially rotating multi-pivot hinge assembly sequentially rotates from a storage position to a deployed position starting with a first individual hinge axis proximate to the second portion and proceeding only to a second adjacent individual hinge axis when the first individual hinge axis has completed a defined range of rotation, the first individual hinge axis being between the second portion and the second adjacent individual hinge axis.

9. The computing device of claim 8, wherein the second portion is configured to be positioned on a horizontal surface and the first portion is configured to be rotated relative to the horizontal surface from the storage position to the deployed position, wherein a footprint of the computing device is extended in the deployed position compared to the storage position, and wherein the extended footprint maintains a center of mass of the computing device above the extended footprint in the deployed position.

10. The computing device of claim 8, wherein the covered sequentially rotating multi-pivot hinge assembly further comprises a set of overlapping hinge covers.

11. The computing device of claim 8, further comprising a battery and a processor positioned in the first portion.

12. The computing device of claim 8, wherein the covered sequentially rotating multi-pivot hinge assembly further comprises hinge elements that respectively define the first and second hinge axes.

13. The computing device of claim 9, wherein the storage position comprises the second portion positioned on the horizontal surface and the first portion positioned over the second portion in a substantially horizontal orientation and the first portion is configured to be rotated relative to the horizontal surface to the deployed position that is obtuse to the horizontal surface.

14. The computing device of claim 10, wherein the set of overlapping hinge covers interact with the timed link elements to control the sequence of rotation.

15. The computing device of claim 12, wherein the hinge elements comprise friction engines.

16. A computing device, comprising:
a first portion and a second portion; and,
a multi-axis hinge assembly securing the first portion and the second portion, the multi-axis hinge assembly including overlapping hinge covers and timed link elements positioned in the overlapping hinge covers that define an order of rotation of individual hinge axes of the multi-axis hinge assembly such that the multi-axis hinge assembly sequentially rotates starting with a first timed link element proximate to the second portion and proceeding only to a second timed link element when the first timed link element has completed a first defined range of rotation.

17. The computing device of claim 16, wherein the timed link elements further define a reverse order of rotation starting with the second timed link element and proceeding only to the first timed link element when the second timed link element has completed a second defined range of rotation, the second defined range of rotation being in an opposite direction to the first defined range of rotation.

18. The computing device of claim 16, wherein the first timed link element interacts with first and second individual hinge covers of the hinge covers and wherein the first timed link element blocks rotation of the second individual hinge cover until the first individual hinge cover has completed the first defined range of rotation.

19. The computing device of claim 18, wherein at least one of the first and second individual hinge covers are adjacent to one another or a third individual cover of the hinge covers is interposed between the first and second individual hinge covers.

* * * * *